(12) United States Patent
Tajiri et al.

(10) Patent No.: US 10,962,293 B2
(45) Date of Patent: Mar. 30, 2021

(54) HEAT EXCHANGER ASSEMBLY

(71) Applicant: Unison Industries, LLC, Jacksonville, FL (US)

(72) Inventors: Gordon Tajiri, Waynesville, OH (US); Emily Marie Phelps, Bellbrook, OH (US); Dattu GV Jonnalagadda, Ponnur (IN); Joseph Richard Schmitt, Springfield, OH (US); Yanzhe Yang, Mason, OH (US)

(73) Assignee: Unison Industries, LLC, Jacksonville, FL (US)

( * ) Notice: Subject to any disclaimer, the term of this patent is extended or adjusted under 35 U.S.C. 154(b) by 170 days.

(21) Appl. No.: 15/903,685

(22) Filed: Feb. 23, 2018

(65) Prior Publication Data

US 2019/0264982 A1 Aug. 29, 2019

(51) Int. Cl.
*F28F 9/00* (2006.01)
*F28D 7/00* (2006.01)
(Continued)

(52) U.S. Cl.
CPC .............. *F28D 7/0008* (2013.01); *F02C 7/14* (2013.01); *F28D 7/16* (2013.01); *F28F 7/02* (2013.01);
(Continued)

(58) Field of Classification Search
CPC .. F28D 7/0008; F28D 7/16; F28D 2021/0021; F28D 2021/0094; F02C 7/14; F28F 7/02; F28F 9/02; F28F 9/0239; F28F 21/084; F28F 21/087; F28F 2009/029; F28F 2255/02; F28F 2265/26; F05D 2230/30
See application file for complete search history.

(56) References Cited

U.S. PATENT DOCUMENTS

| | | | |
|---|---|---|---|
| 1,571,068 A * | 1/1926 | Stancliffe | F28F 7/02 |
| | | | 165/165 |
| 3,308,879 A | 3/1967 | Maddocks | |

(Continued)

FOREIGN PATENT DOCUMENTS

| | | | |
|---|---|---|---|
| EP | 1903207 A1 * | 3/2008 | ............ F28F 9/0239 |
| EP | 1903207 A1 | 3/2008 | |

(Continued)

OTHER PUBLICATIONS

Extended European Search Report issued in related European Patent Application No. 19158877.1, 6 pages, dated Jul. 23, 2019, The Hague, Munich, Germany.

(Continued)

*Primary Examiner* — Claire E Rojohn, III
(74) *Attorney, Agent, or Firm* — McGarry Bair PC

(57) ABSTRACT

An apparatus and method of forming a heat exchanger including a thermally compliant material and geometry with a core having a first set of flow passages and a second set of flow passages passing through the core. A first manifold of high temperature and strength material defines a fluid inlet for the first set of flow passages and a second manifold of high temperature and strength material defines a fluid inlet for the second set of flow passages. At least one of the first and second manifolds can include an in-situ compliant portion to provide for compliance during thermal expansion of the heat exchanger.

17 Claims, 5 Drawing Sheets

(51) Int. Cl.
*F28F 9/02* (2006.01)
*F28F 21/08* (2006.01)
*F28D 7/16* (2006.01)
*F28F 7/02* (2006.01)
*F02C 7/14* (2006.01)
*F28D 21/00* (2006.01)

(52) U.S. Cl.
CPC .............. *F28F 9/02* (2013.01); *F28F 9/0239* (2013.01); *F28F 21/084* (2013.01); *F28F 21/087* (2013.01); *F05D 2230/30* (2013.01); *F28D 2021/0021* (2013.01); *F28D 2021/0094* (2013.01); *F28F 2009/029* (2013.01); *F28F 2255/02* (2013.01); *F28F 2265/26* (2013.01)

(56) References Cited

U.S. PATENT DOCUMENTS

| | | | |
|---|---|---|---|
| 6,267,176 | B1 | 7/2001 | Bolla |
| 6,883,502 | B2 | 4/2005 | Nechvatal |
| 7,980,293 | B2 | 7/2011 | Jensen |
| 9,200,855 | B2 | 12/2015 | Lo |
| 9,206,767 | B2 | 12/2015 | Zhang et al. |
| 9,752,835 | B2 | 9/2017 | Morris |
| 10,415,897 | B2 * | 9/2019 | Kupiszewski .......... F28F 13/12 |
| 2002/0023735 | A1 * | 2/2002 | Uchikawa ........... F28D 1/05383 165/81 |
| 2016/0231072 | A1 | 8/2016 | Pohlman |
| 2016/0290738 | A1 * | 10/2016 | Kupiszewski .......... F28F 21/08 |
| 2017/0044980 | A1 * | 2/2017 | Duesler .................... F02C 7/18 |
| 2017/0044982 | A1 * | 2/2017 | Duesler .................. F02C 7/141 |

FOREIGN PATENT DOCUMENTS

| | | | | |
|---|---|---|---|---|
| EP | 3086075 | A1 | 10/2016 | |
| EP | 31333631 | A | 2/2017 | |
| EP | 3196585 | A1 * | 7/2017 | ............... F28F 9/02 |
| JP | S58129196 | A | 8/1983 | |
| JP | 2017180100 | A | 10/2017 | |
| WO | 2011115883 | A2 | 9/2011 | |
| WO | 2013139113 | A1 | 9/2013 | |
| WO | 2015126483 | A2 | 8/2015 | |
| WO | 2017019601 | A | 2/2017 | |

OTHER PUBLICATIONS

Japanese Patent Office, First Office Action re Corresponding Application No. 2019-031079, dated Jul. 20, 2020, 6 pages, Japan.

Guo Shizheng, "Research and Application of Wave-guide with the Flange Electroforming Connection Technology", May 2008, 3 pages, 0871 Plant, Anhui Lu'an.

Chinese Patent Office, Office Action re Corresponding Application No. 201910137030.X, dated May 22, 2020, 9 pages, China.

European Patent Office, Office Action re Corresponding Application No. 19158877.1—1008, dated Oct. 13, 2020, 5 pages, Munich, Germany.

* cited by examiner

HEAT EXCHANGER ASSEMBLY

BACKGROUND

Contemporary engines used in aircraft produce substantial amounts of heat that must be transferred away from the engine in one way or another. Heat exchangers provide a way to transfer heat away from such engines.

Oil can be used to dissipate heat from engine components, such as engine bearings, electrical generators, and the like. Heat is typically transferred from the oil with heat exchangers to maintain oil temperatures at a desired range from approximately 100° F. to 300° F. In many instances, an external environment can be as low as −65° F. or the temperature of the aircraft fuel can be significantly lower than the oil temperatures. In such an example, a flow of cool air or the engine fuel can be used to cool the oil via the heat exchanger. For example, bleed air having a high temperature (>700° F.) and pressure can be cooled with ambient external bypass air. Other applications utilize air, fuel, and oil to both cool and heat one another, depending on the need.

Additionally, heat exchangers can be placed in the aircraft for dissipating heat generated by electrical systems, such as within an avionics chassis. The heat exchangers can include a plurality of elements, such as conduits, to draw heat from the electrical components. The heat exchanger can be used to dissipate the heat drawn from the electrical components.

BRIEF DESCRIPTION

In one aspect, the present disclosure relates to a heat exchanger including a core having a first set of flow passages and a first manifold having a first wall and a first fluid inlet, with the first fluid inlet in fluid communication with the first set of flow passages. A compliant portion forms at least part of the first wall.

In another aspect, the present disclosure relates to a heat exchanger including a core having an outer housing and an inner section, further including a first set of flow passages and a second set of flow passages wherein at least a portion of the first set of flow passages are thermally coupled with at least a portion of the second set of flow passages. A first manifold has a first wall and defines a first fluid inlet in fluid communication with the first set of flow passages. A second manifold has a second wall and defines a second fluid inlet in fluid communication with the second set of flow passages. A compliant portion is provided on at least one of the first wall, the second wall, or the outer housing configured to allow for thermal growth.

In yet another aspect, the present disclosure relates to a method of forming a heat exchanger including: forming a core having at least a first set of flow passages; and electroforming onto a portion of the core a first manifold having at least a first wall and in fluid communication with the first set of flow passages, with a compliant portion provided on the first wall.

DETAILED DESCRIPTION

Figure 1:
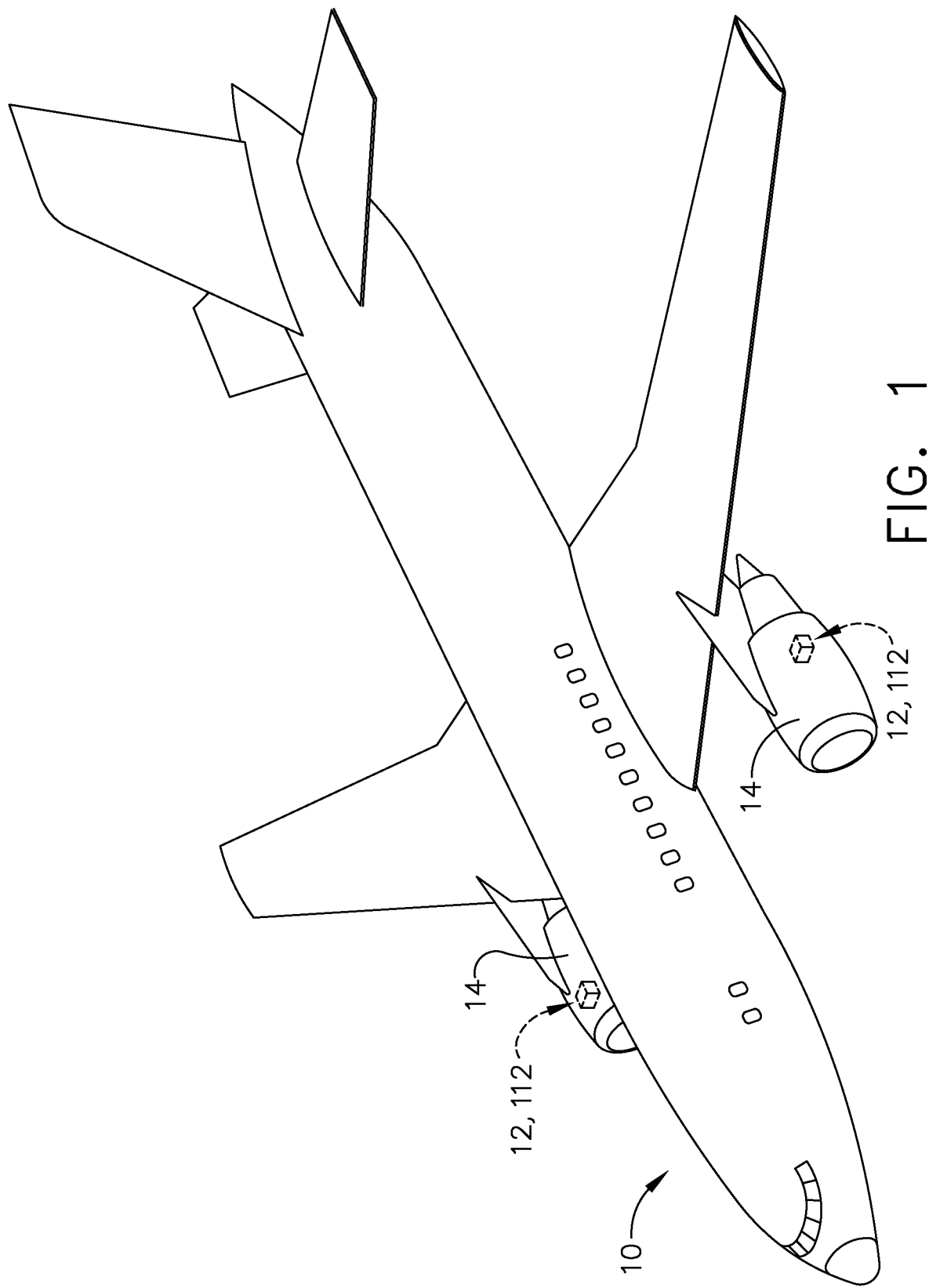
FIG. 1 is a perspective view of an aircraft having a heat exchanger provided in an aircraft engine, in accordance with various aspects described herein.

Aspects of the disclosure described herein are directed to a heat exchanger assembly. For purposes of illustration, the present disclosure will be described with respect to a heat exchanger provided in the interior of an aircraft engine. It will be understood, however, that aspects of the disclosure described herein are not so limited and can have general applicability within any environment requiring or utilizing heat exchangers or convective heat transfer, such as within a turbine engine for the aircraft, but also including non-aircraft applications, such as other mobile applications and non-mobile industrial, commercial, and residential applications.

As used herein, the term "forward" or "upstream" refers to moving in a direction being relatively closer to an inlet or source of a flow of fluid or gas through a heat exchanger. The term "aft" or "downstream" refers to a direction being relatively closer to an outlet or end of a heat exchanger. As used herein, the term "set" can refer to one or more of an element. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. The exemplary drawings are for purposes of illustration only and the dimensions, positions, order and relative sizes reflected in the drawings attached hereto can vary. As used herein, the term "set" or a set of an article should be understood to include any number of said article, including only one.

Referring now to FIG. 1, an aircraft 10 includes a pair of heat exchangers 12, 112 (shown in dashed line), which are arranged in a pair of aircraft engines 14 mounted to the aircraft 10. The heat exchangers 12, 112 aid in dissipating the heat generated by the engines 14. It should be understood that the heat exchangers 12, 112 can be located anywhere within the aircraft 10, not just within the engines 14 as illustrated. For example, there can be any number of heat exchangers arranged around the aircraft 10 at any position. While illustrated in a commercial airliner, the heat exchangers 12, 112 can be used in any type of aircraft, for example, without limitation, fixed-wing, rotating-wing, rocket, commercial aircraft, personal aircraft, and military aircraft. Furthermore, aspects of the disclosure are not limited only to aircraft aspects, and can be included in other mobile and stationary configurations. Non-limiting example mobile configurations can include ground-based, water-based, or additional air-based vehicles. Any implementation has its own space constraints and temperature or operational requirements. As such, the design of the particular aspects of the heat exchanger as described herein can be tailored to suit specific installation requirements of the implementation.

Figure 2:
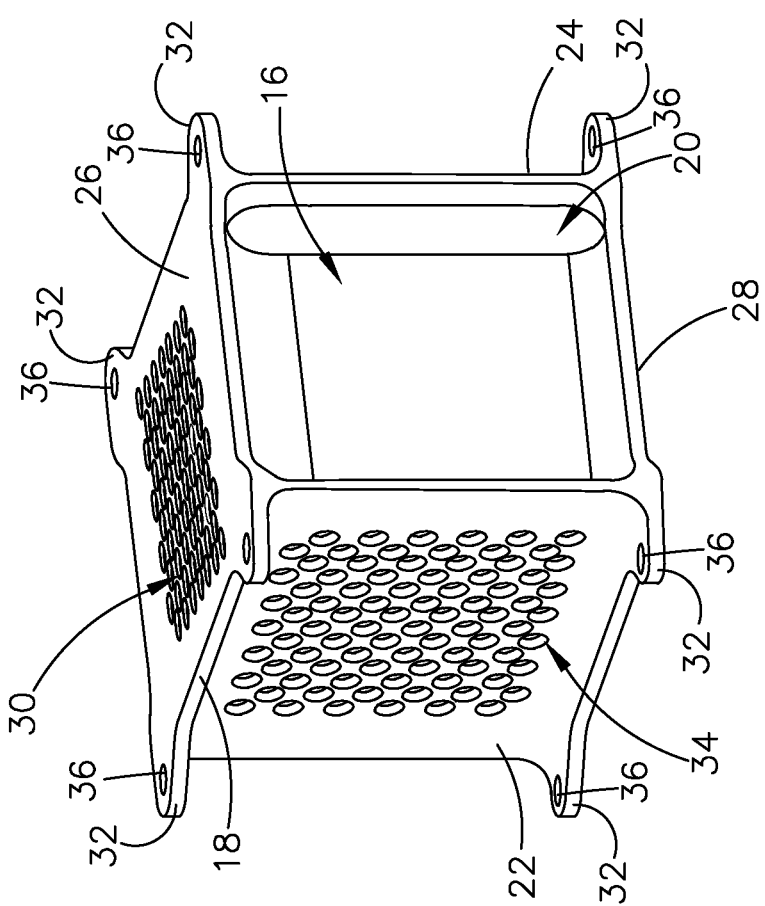
FIG. 2 is a perspective view of a heat exchanger that can be used in the aircraft of FIG. 1.

Referring now to FIG. 2, the heat exchanger 12 can include a heat exchanger core 16 defining an inner section 20, and including a first side 22, a second side 24, a third side 26, and a fourth side 28. A first set of flow passages 30 extending from the first side 22 to the second side 24. A second set of flow passages 34 can extend from the third side 26 to the fourth side 28. The first set of flow passages 30 can be thermally coupled with the second set of flow passages 34 so that heat of a fluid, either gas or liquid, flowing through one can be transferred to a fluid flowing through the other. In one non-limiting example, the first and second sets of flow passages 30, 34 can be intertwined and the first and second sets of flow passages 30, 34 can be complex, with a multi-faceted, convoluted geometry made from additive 3D metal printing, for example. In other example, the flow passages could be treacherous-path or diabolically convoluted geometries. Alternatively, other suitable methods of forming the core 16 having the first and second sets of flow passages 30, 34 are contemplated, such as casting in one non-limiting example. As such, the heat exchanger core 16 can be considered as a monolithic block for the heat exchanger 12. The core 16 is preferably made of a material having a high heat transfer coefficient to facilitate transfer of heat between the first set of flow passages 30 and the second set of flow passages 34. One such suitable material can be aluminum, for example. For high temperature applications, nickel and cobalt alloys are possible alternatives.

An outer housing or skin 18 can surround the core 16. A set of flanges 32 can extend from the skin 18, and can include apertures 36 provided in the flanges 32. While not shown, one or more load paths can be included with the skin 18, adapted to receive physical or thermal loads during operation of the heat exchanger. Such load paths can be formed in the inner section 20, and can be dependent on the geometry of the core 16, or the first or second sets of flow passages 30, 34. The skin 18 can couple to and share such load paths. It is further contemplated that the skin 18 can include additional structures adapted to form a load path along or through the core 16 for carrying a structural or thermal load. Thus, the skin 18 can form the structural boundary for carrying the heat exchanger core 16, and can at least partially surround the core 16, or surround only a portion of the core 16. In one example, the skin 18 can be integral with the core 16.

Figure 3:
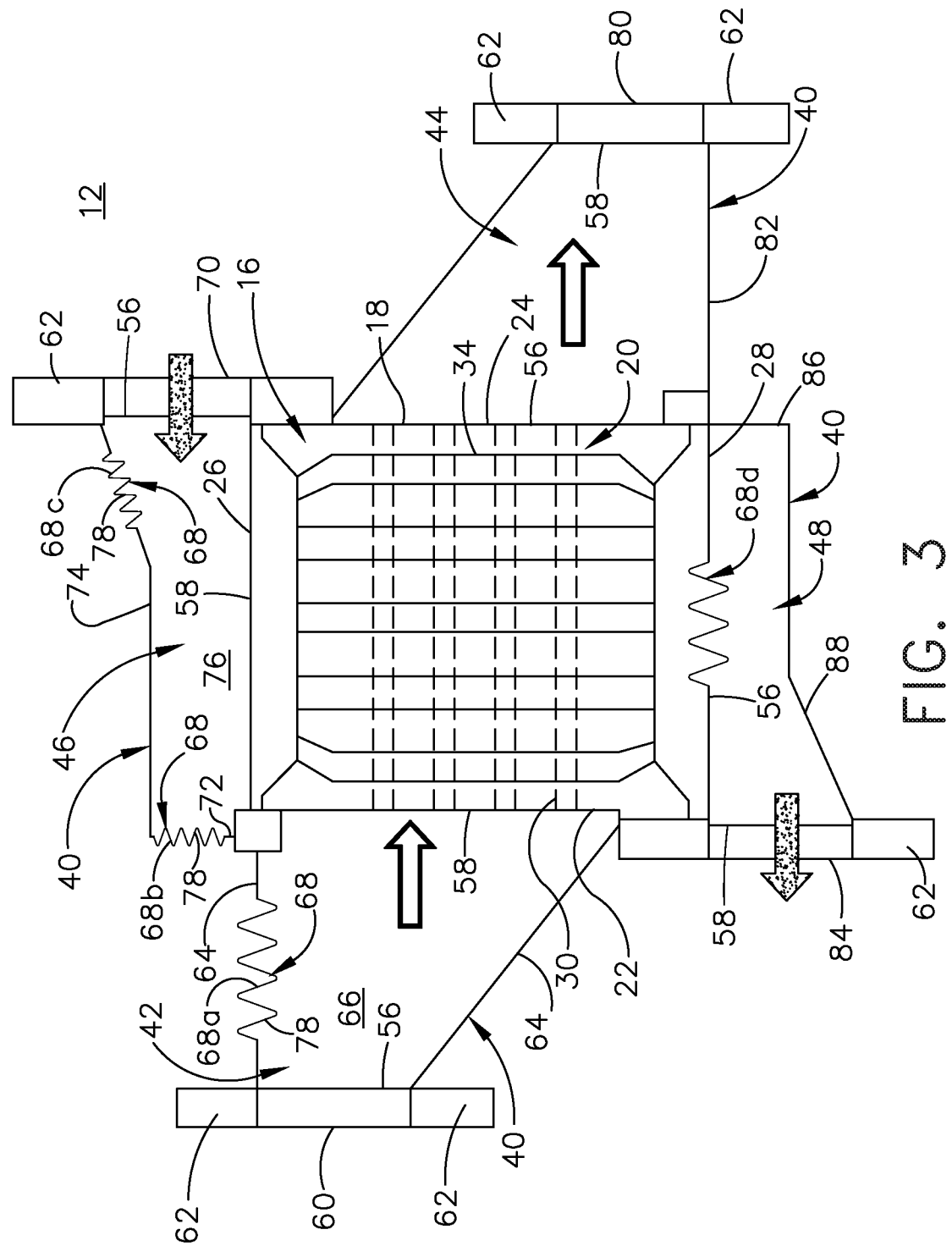
FIG. 3 is a schematic view of a heat exchanger including a set of compliant electroformed features that can be used in the aircraft of FIG. 1.

Referring now to FIG. 3, a set of manifolds 40, shown as four manifolds 40, can couple to the core 16 or the skin 18 to provide for ingress and egress of fluid to the core 16. The core 16, the skin 18, and the manifolds 40, or any subset thereof, can be formed as an integral or unitary body, forming a single element having two or more of the core 16, skin 18, or the manifolds 40. Each manifold 40 can include an inlet plane 56 and an outlet plane 58, providing for ingress or egress of fluid to or from the manifold 40. The set of manifolds 40 can provide for ingress and egress of fluid to the first and second sets of flow passages 30, 34 via the inlet plane 56 or the outlet plane 58. As such, for a manifold 40 having a flow entering the first and second sets of flow passages 30, 34, the inlet plane 56 is spaced from the core 16, while the outlet plane 58 can be adjacent the core 16. Similarly, but opposite, a manifold 40 providing for flow coming from the first and second sets of flow passages 30, 34, the inlet plane 56 can be adjacent the core 16, while the outlet plane 58 can be spaced from the core 16. It should be understood that "plane" as used herein, in regards to an inlet plane 56 and an outlet plane 58, should not necessarily represent a geometrical plane or mean geometrically planar, but rather be representative of a boundary or threshold defining an inlet or an outlet for a referenced manifold 40, and can be relative to flow direction through the manifold 40. It should be understood that any suitable geometry for the set of manifolds 40 is contemplated. The set of manifolds 40 can include a first inlet manifold 42, a first outlet manifold 44, a second inlet manifold 46, and a second outlet manifold 48. A set of mounting flanges 62 can couple to the set of manifolds 40. The mounting flange 62 can mount to a fixed structure for mounting the heat exchanger 12, such as to a portion of the engine 14 of FIG. 1.

The first inlet manifold 42 couples to the rigid core 16 adjacent the first set of flow passages 30 at the first side 22. Alternatively, the first manifold 42 and the core 16 can be an integral body or a unitary body, formed as a single element incorporating both the manifold 42 and the core 16. A first inlet 60 can be formed in the first inlet manifold 42, spaced from the first set of flow passages 30. One or more sidewalls 64 can at least partially form the first inlet manifold 42 can extend between the mounting flange 62 and the core 16, defining an interior 66 for the first inlet manifold 42. A compliant portion 68 or compliant feature is provided at least partially along the sidewall 64 and forms at least a part of the sidewall 64. Alternatively, the compliant portion 68 can at least partially form the manifold 40 between the inlet plane 56 and the outlet plane 58. As a non-limiting example, the compliant portion 68 has been illustrated as corrugations including a first compliant portion 68a in the sidewall 64. The first compliant portion 68a forms a portion of the first inlet manifold 42, and can be formed as an integral body with a remainder of the first inlet manifold 42. The first compliant portion 68a can include a plurality of ridges 78 that can be sized to a specific height, as may be desirable to tailor the compliant portion 68 and its movement to the particular inlet manifold. It is contemplated that the first compliant portion 68a can extend around the sidewall 64, such as when the sidewall 64 is cylindrical or conic, for example. In yet another example, it is contemplated that the entire length of the sidewall 64 is formed with the first compliant portion 68a or that the length of the sidewall 64 can include numerous compliant portions. The first compliant portion 68a can be rigid having a high tensile strength, while adapted to expand and contract during thermal expansion of the core 16. The first inlet manifold 42 can be made of nickel, nickel-cobalt, or a Nickel alloy, in non-limiting examples. Such materials provide for a high tensile strength, while the compliant portions 68 provide compliance under thermal expansion. Particularly, such materials can provide for increased strength and impact resistance up to 600 degrees Fahrenheit (F), while more particularized alloys can provide for temperatures up to 1000 degrees F. or more.

The first outlet manifold 44 is fluidly coupled to the core 16 adjacent the first set of flow passages 30 at the second side 24. A first outlet 80 can be formed in the first outlet manifold 44, spaced from the first set of flow passages 30. The first outlet manifold 44 can be positioned opposite of the first inlet manifold 42, relative to the core 16, and can fluidly couple to the first inlet manifold 42 via the first set of flow passages 30. The first outlet manifold 44 can include a sidewall 82 and geometry similar to that of the first inlet manifold 42. While no compliant portion is shown on the first outlet manifold 44, it is contemplated that the first outlet manifold 44 can include one or more compliant portions, such as formed in the sidewall 82 or between the inlet plane 56 and the outlet plane 58.

A second inlet manifold 46 couples to the core 16 adjacent the second set of flow passages 34 at the third side 26. A second inlet 70 can be formed in the second inlet manifold 46, and can be spaced from the second set of flow passages 34. A first sidewall 72 can extend from the core 16 to a second sidewalls 74. The second sidewall 74 can be arranged substantially orthogonal to the first sidewall 72; however, any orientation is contemplated. The first and second sidewalls 72, 74 can at least partially define an interior 76 for the second inlet manifold 46.

Compliant portions 68 are included in both the first sidewall 72 and the second sidewall 74, and can at least partially form the second inlet manifold 46 between the inlet plane 56 and the outlet plane 58. By way of non-limiting examples such compliant portions have been illustrated as a second compliant portion 68b provided in the first sidewall 72 and a third compliant portion 68c provided in the second sidewall 74. The second compliant portion 68b and the third compliant portion 68c both form a portion of the second inlet manifold 46, and can form an integral body with a remainder of the second inlet manifold 46. As compliant portions 68 are provided in both the first sidewall 72 and the second sidewall 74, the compliant portions 68 can permit flexion of the second inlet manifold 46 in two degrees of freedom, orthogonal to one another in the illustrated example. In one example, a sizing of the ridges 78 for the first compliant portion 68a can be larger than a sizing of the ridges 78 of the second compliant portion 68b. Alternatively, a sizing of the ridges 78 among all compliant portion 68a-68c can be varied to be tailored to an anticipated thermal expansion of the related manifold 40, and can be larger or smaller than one another as may be preferred.

The second outlet manifold 48 can include a first sidewall 86 and a second sidewall 88, similar to the sidewalls 72, 74 of the second inlet manifold 44. The second outlet manifold 48 couples to the core 16 adjacent the second set of flow passages 34 at the fourth side 28. A second outlet 84 can be formed in the second outlet manifold 48, and can be spaced from the second set of flow passages 34. The second outlet manifold 48 can be positioned opposite of the second inlet manifold 46 relative to the core 16, and can fluidly couple to the second inlet manifold 46 via the second set of flow passages 34. It is further contemplated that the second outlet manifold 48 can include one or more compliant portion 68, such as within the sidewalls 86, 88, or between the inlet plane 56 and the outlet plane 58.

It should be appreciated that the organization for the heat exchanger 12 and manifolds 40 as shown are exemplary, and that any suitable geometry for the core 16 that provides for a heat exchange between a hot fluid and a cold fluid can form the suitable heat exchanger 12. It should be understood that the manifolds 40 have been illustrated merely for exemplary purposes and can include any suitable shape, profile, arrangement, or attachments for effectively providing one or more fluids to, and removing one or more fluids from the heat exchanger 12 or the core 16. While the compliant portion are illustrated and described as corrugated, it should be appreciated that any suitable flexural element adapted to flex relative to thermal expansion of the core 16 can be utilized. Alternative compliant portions can include corrugations, convolutions, sinusoidal convolutions, or sinusoids in non-limiting examples. Alternatively, the compliant portion 68 can be a compliant wall, having an extendable and retractable section. Such extendable and retractable sections can be formed as convolutions or corrugations, permitting extension or retraction of the manifold at the compliant portion. Similarly, any number of compliant portion 68 in any position along the manifolds is contemplated. Furthermore, it is contemplated that the compliant portion can be provided on the skin 18, as well as any structural portion of the core 16.

In one alternative examples, a compliant portion 68 can be formed as a housing compliant portion 68d, formed within a portion of the outer housing or the skin 18. Such a compliant portion 68d can provide for reduction of local stresses along a load path of the housing 18 or skin 18.

During operation, a first fluid can be provided through the core 16 along the first set of flow passages 30, such as a hot fluid. Therefore, the first inlet manifold 42, the first set of flow passages 30, and the first outlet manifold 44 can form a hot fluid path. The first inlet 60 can be a hot inlet and the first outlet 80 can be a hot outlet.

A second fluid can be provided through the core 16 along the second set of flow passages 34, such as a cold fluid. Therefore, the second inlet manifold 46, the first set of flow passages 34, and the first outlet manifold 44 can form a cold fluid path. The second inlet 70 can be a cold inlet and the second outlet 84 can be a cold outlet.

During simultaneous flow of the hot fluid and the cold fluid, a heat exchange takes place within the core 16, cooling the hot fluid and heating the cold fluid. An average of the temperatures between the hot fluid and the cold fluid within the core 16 can define a mean temperature for fluids passing through the core 16. Dependent on the extreme temperatures of the hot and cold fluids a large temperature difference, or temperature gradient, can exist between the mean temperature of the rigid core 16 and the hot or cold fluids at the first and second inlet manifolds 42, 46, respectively. Resultant of increasing or decreasing temperatures in the core 16, thermal expansion and contraction of the core 16 can occur. Such expansion and contraction of the core 16 can cause thermal stresses at the junction between the core 16 and the structurally fixed manifolds 40. The thermal stresses can be the result of the significant temperature change of the core 16 resulting in thermal expansion. An additional and superimposed high temperature gradient condition can occur between a local hot section of the thermal core adjacent to the cold inlet manifold fluid. A significant temperature gradient will exist at this location. A similar condition can occur at a local region between a cold fluid passage of the core and the hot inlet manifold fluid. Such thermal and superimposed structural stresses can result in fracture or deformation of the heat exchanger 12, which can reduce component life or require increased maintenance. Furthermore, such thermal stresses can be exacerbated due to a structurally stiff core 16, resultant of the complex geometry of the first and second sets of flow passages 30, 34 forming the core 16.

Additionally, thermal expansion of the core 16 can cause physical stresses at the junction between the manifolds 40 and the mounting flanges 62. As a result, the structurally stiff mounting flange 62 can be particularly susceptible to damage or deformation due to the increased superimposed thermal and physical stresses.

The compliant portions 68 provide for flexion of portions of the heat exchanger 12, where they have been included at the core 16 to the manifolds 40 during thermal expansion or contraction of the core 16. Flexion portions of the heat exchanger 12 at the compliant portions 68 provide for reducing local thermal and physical stresses, which can reduce the incidence of damage or deformation of the heat exchanger 12. Among other things, the compliant portions 68 can decouple the thermal stresses from the mounting flanges 62. Such decoupling of the thermal stresses reduces the stresses on the fixed mounts of the heat exchanger 12. Reduction of the stresses on the fixed mounts of the heat exchanger can provide for increased operational lifetime of the heat exchanger 12, and reduce required maintenance.

Figure 4:
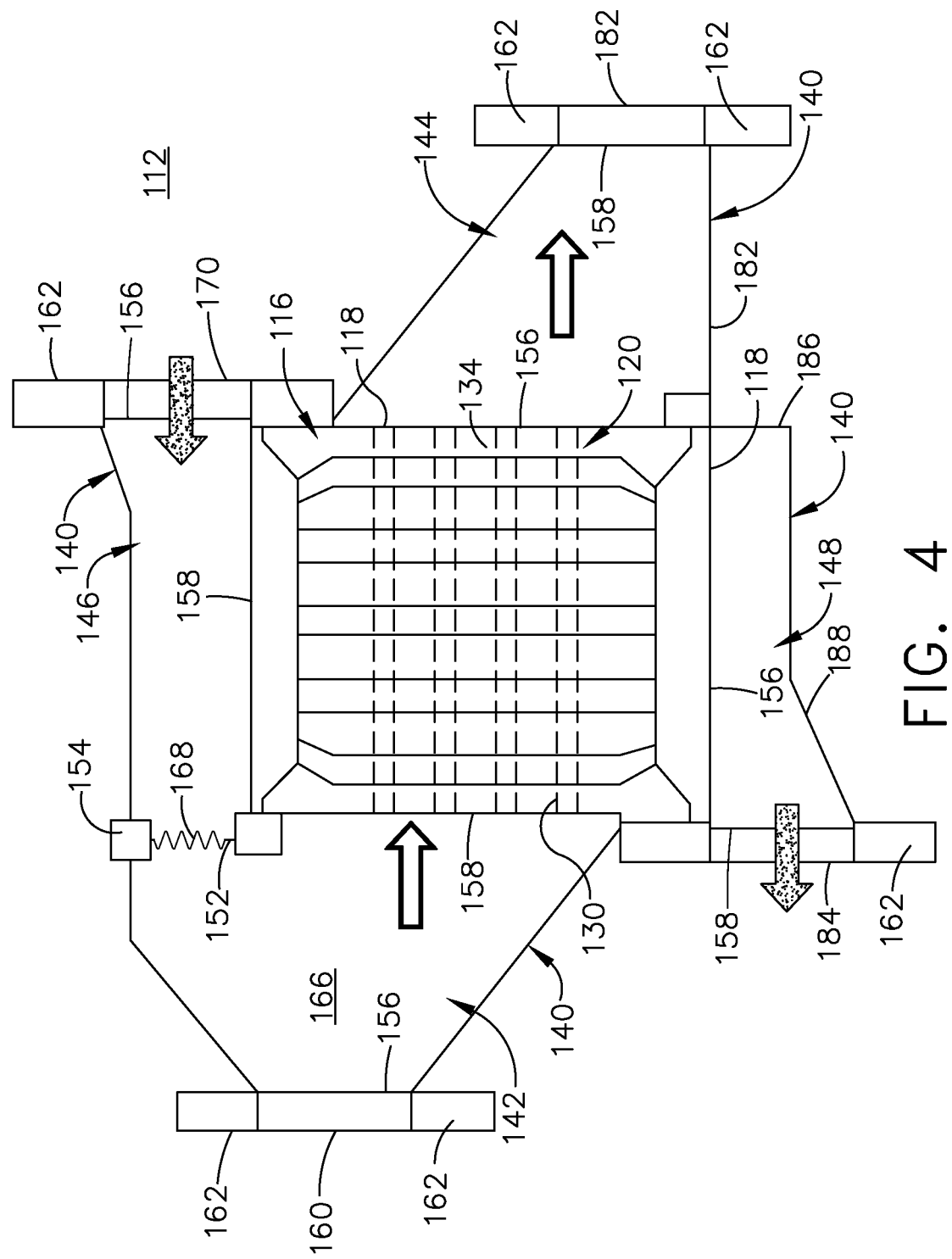
FIG. 4 is a schematic, cross-sectional view of a heat exchanger assembly having a compliant electroformed feature that can be used in the aircraft of FIG. 1.

Referring now to FIG. 4, another exemplary heat exchanger 112 that can be utilized in the aircraft 10 is illustrated and can be substantially similar to the heat exchanger 12 of FIG. 3. As such, similar numerals will be used to described similar elements, increase by a value of one hundred and the discussion will be limited to differences between the heat exchanger 12 and the heat exchanger 112.

One difference that is illustrated includes that a first inlet manifold 142 and a second inlet manifold 146 include a shared wall 152 extending between a boundary 154 and a core 116, and can at least partially form the first and second inlet manifolds 142, 146. The shared wall 152 can be a structurally stiff sidewall that at least partially defines both the first inlet manifold 142 and the second inlet manifold 146. The boundary 154 can be a fixed boundary, for example, or can be a floating boundary at the junction between the first and second inlet manifolds 142, 146.

A compliant portion 168 or compliant feature can be provided in the shared wall 152, or can at least partially form the manifold 140 between an inlet plane 156 and an outlet plane 158. As a non-limiting example, the compliant portion 168 has been illustrated as corrugations in the shared wall 152. Alternative compliant portions can include corrugations, convolutions, sinusoidal convolutions, or sinusoids in non-limiting examples. The compliant portion 168 can provide compliance for both the first inlet manifold 142 and the second inlet manifold 146 simultaneously relative to thermal expansion of the core 116, which can reduce cost and complexity of the design. Additionally, having the compliant portion 168 provided along a shared wall 152 can provide for improved compliance between the rigid core 116 and two inlet manifold walls. The large temperature gradients between the two incoming fluids is transferred away from the weaker core material locations and into the two manifolds with the higher tensile strength material (>100 ksi UTS). Such a shared compliant portion can provide for reducing local thermal stresses in the core 116 and transferring the combined thermal and structural stresses to the higher strength manifold material.

Figure 5:
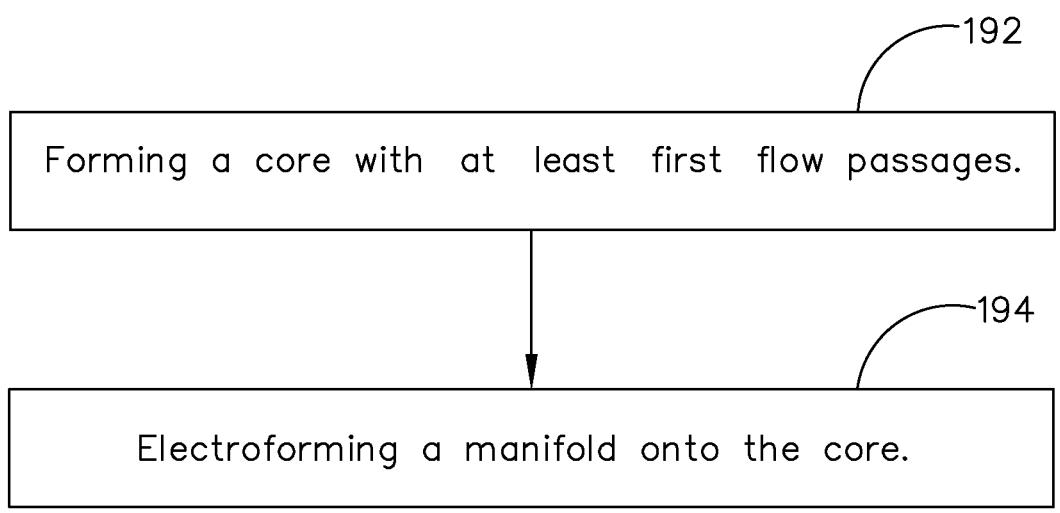
FIG. 5 is a flow chart illustrating a method of forming a heat exchanger such as the heat exchanger of FIG. 3, in accordance with various aspects described herein.

Referring now to FIG. 5, a method 190 of forming a heat exchanger can includes: at 192, forming a complex, thermally optimized, rigid core with at least a first set of flow passages; and, at 194, electroforming a first manifold having at least a first wall onto the core. At 192, forming the core can include any core as described herein, such as the core 16 of FIG. 2. Forming the core 16 can include a first set of flow passages, such as the first set of flow passages 30 of FIG. 2. The core 16 could additionally form a second set of flow passages, such as the second set of flow passages 34 of FIG. 2, or any suitable number of sets of flow passages. The first and second sets of flow passages 30, 34 can be intertwined among one another, and can form a monolithic body. Forming the core can include forming the core with direct metal laser melting (DMLM) or direct metal laser sintering (DMLS), or any other suitable method capable of forming the complex geometries of the core 16 and the first and second sets of flow passages 30, 34. Alternatively, any suitable additive manufacturing process can be used to form the core 16. The core can be formed of a metal having a high heat transfer coefficient, such as aluminum.

At 194, a first manifold, such as any of the set of manifolds 40 or the first inlet manifold 42 described herein, can be electroformed onto a portion of the core 16. The manifold or manifolds can be high-strength compliant inlet and outlet manifolds, including a compliant portion provided on the first wall. The first inlet manifold 42 can define a first fluid inlet that is in fluid communication with the first set of flow passages 30. At least a portion of the first manifold can include a compliant portion, such as the compliant portions 68 of FIG. 2. The manifold can be formed from a metal having a high temperature and tensile strength, such as nickel, nickel-cobalt, or a nickel alloy.

Additionally, a second manifold, such as the second inlet manifold 46, or additional manifolds can be electroformed onto the core 16. One or more of the second inlet manifold 46 or additional manifolds can include another compliant portions or corrugated portion. For example, the second inlet manifold 46 can include the compliant portion or corrugated portion. Such manifolds 46 can include one or more fluid inlets or outlets for the first set of flow passages 30 or the second set of flow passages 34.

Typical heat exchangers have high local thermal stresses at the rigid thermal core, the hot inlet manifold, and the cold inlet manifold. The large temperature differences between the hot inlet and the cold inlets, the high structural stiffness of the core, and the rigid housing connections to adjacent fixed boundary conditions such as the mounting flanges results in high local thermal stresses. Utilizing a hybrid DMLM core with additively manufactured outer manifold walls including the compliant portion provides for reducing the high local thermal stresses. Utilizing additive manufacturing, such as electroforming, to form the heat exchanger permits a complex geometry for the core, as well as the compliant structures of the manifold having a high tensile strength. Additionally, utilizing the compliant flexures permits the walls of the manifolds to be thinner, which can decrease weight, which can decrease specific fuel consumption in particular implementations.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

To the extent not already described, the different portions, features and structures of the various aspects may be used in combination with each other as desired. That one feature may not be illustrated in all of the aspects is not meant to be construed that it may not be, but is done for brevity of description. Thus, the various features of the different aspects may be mixed and matched as desired to form new aspects, whether or not the new aspects are expressly described. All combinations or permutations of features described herein are covered by this disclosure.

What is claimed is:
1. A heat exchanger, comprising:
a core having a first set of flow passages;
a first manifold having a first wall and a first fluid inlet, with the first fluid inlet in fluid communication with the first set of flow passages;
a compliant portion forming at least part of the first wall to provide compliance for the first wall; and a second set of flow passages in the core and a second manifold having a second wall with a second compliant portion and in fluid communication with the second set of flow passages;

wherein the first wall and the second wall form a shared wall adjoining the first and second manifolds and wherein the compliant portion forms at least a portion of the shared wall.

2. The heat exchanger of claim 1 wherein a sizing of ridges in the compliant portion in the first wall is tunable with respect to sizing of ridges of the second compliant portion.

3. The heat exchanger of claim 1 wherein the first manifold further includes a third compliant portion.

4. The heat exchanger of claim 1 wherein an outer housing surrounds the core and the first manifold operably couples to the outer housing.

5. The heat exchanger of claim 4 wherein the outer housing further comprises a housing compliant portion.

6. The heat exchanger of claim 1 wherein the core and the first manifold with the compliant portion are either an integral body or a unitary body.

7. The heat exchanger of claim 6 wherein the core is aluminum and the first manifold is nickel, nickel-cobalt, or a nickel alloy.

8. The heat exchanger of claim 1, further comprising a mounting flange distally located from the compliant portion and wherein the mounting flange is configured to mount to a portion of an aircraft.

9. A heat exchanger, comprising:
  a core having a first set of flow passages and a second set of flow passages;
  a first manifold having a first wall and a first fluid inlet, with the first fluid inlet in fluid communication with the first set of flow passages;
  a compliant portion forming at least a portion of the first wall to provide compliance for the first wall;
  a second manifold having a second wall and a second fluid inlet, with the second fluid inlet in fluid communication with the second set of flow passages;
  a second compliant portion forming at least a portion of the second wall; and
  a third compliant portion forming at least a portion of the second wall.

10. The heat exchanger of claim 9 wherein a sizing of ridges in the compliant portion in the first wall is tunable with respect to sizing of ridges of the second compliant portion.

11. The heat exchanger of claim 9 wherein the first wall and the second wall form a shared wall, adjoining the first and second manifolds.

12. The heat exchanger of claim 11 wherein the compliant portion forms at least a portion of the shared wall.

13. The heat exchanger of claim 9 wherein an outer housing surrounds the core and the first manifold operably couples to the outer housing.

14. The heat exchanger of claim 13 wherein the outer housing further comprises a housing compliant portion.

15. The heat exchanger of claim 9 wherein the core and the first manifold with the compliant portion are either an integral body or a unitary body.

16. The heat exchanger of claim 15 wherein the core is aluminum and the first manifold is nickel, nickel-cobalt, or a nickel alloy.

17. The heat exchanger of claim 9, further comprising a mounting flange distally located from the compliant portion and wherein the mounting flange is configured to mount to a portion of an aircraft.

* * * * *